United States Patent
Balasubramanian

(10) Patent No.: US 9,662,657 B2
(45) Date of Patent: May 30, 2017

(54) MULTI-PURPOSE FOOD GRINDING MACHINE

(71) Applicant: Mannarsamy Balasubramanian, Roswell, GA (US)

(72) Inventor: Mannarsamy Balasubramanian, Roswell, GA (US)

(*) Notice: Subject to any disclaimer, the term of this patent is extended or adjusted under 35 U.S.C. 154(b) by 802 days.

(21) Appl. No.: 14/160,513

(22) Filed: Jan. 21, 2014

(65) Prior Publication Data
US 2015/0201809 A1    Jul. 23, 2015

(51) Int. Cl.
| | |
|---|---|
| *B02C 15/00* | (2006.01) |
| *A47J 43/06* | (2006.01) |
| *A47J 43/046* | (2006.01) |
| *A47J 43/08* | (2006.01) |
| *B02C 15/04* | (2006.01) |

(52) U.S. Cl.
CPC ........... *B02C 15/007* (2013.01); *A47J 43/046* (2013.01); *A47J 43/06* (2013.01); *A47J 43/085* (2013.01); *B02C 15/04* (2013.01)

(58) Field of Classification Search
CPC ...... B02C 15/007; B02C 15/04; A47J 43/046; A47J 43/06; A47J 43/085
USPC .................................................. 241/117, 119
See application file for complete search history.

(56) References Cited

U.S. PATENT DOCUMENTS

| | | | | | |
|---|---|---|---|---|---|
| 2,304,326 | A | * | 12/1942 | Adams .................... | B02C 15/04 241/109 |
| 3,061,208 | A | * | 10/1962 | Siegfried .............. | B02C 15/007 241/117 |
| 4,155,511 | A | * | 5/1979 | Kartman ............... | B02C 15/007 241/117 |
| 4,489,895 | A | * | 12/1984 | Petersen ............... | B02C 15/007 241/119 |
| 4,600,157 | A | * | 7/1986 | Willach ................ | B02C 15/007 241/119 |
| 4,860,962 | A | * | 8/1989 | Kiefer ................... | B02C 15/007 241/117 |
| 5,524,840 | A | * | 6/1996 | Gygi ....................... | B02C 15/08 241/117 |
| 2008/0189977 | A1 | * | 8/2008 | Halbleib ................ | B02C 15/04 34/427 |

* cited by examiner

*Primary Examiner* — Faye Francis
(74) *Attorney, Agent, or Firm* — William H. Holt

(57) ABSTRACT

A multi-purpose food grinding machine having an open topped cylindrical vessel that is rotated by a gear reduced motor. The motor is located within a hollow housing. A keyed motor shaft engages a mating aperture in the bottom of the cylinder. A frame holds the housing in place under the vessel. A central shaft is held by the frame and extends downward into the vessel. Rotatable grinding members are attached to the bottom of the shaft so that as the vessel is rotated by the gear motor, the grinding members rotate at the bottom of the vessel causing any food items trapped between the grinding members and the floor of the vessel to be crushed. The grinding members are forced downward by a spring biased mechanism. A spring biased inside wall scraper forces food to drop back down into the vessel.

16 Claims, 7 Drawing Sheets

MULTI-PURPOSE FOOD GRINDING MACHINE

BACKGROUND OF THE INVENTION

This invention relates generally to the field of food processing machines and more specifically to multi-purpose food grinding machines. Various devices both manual and electric have been designed and used to crush and grind items for use in the preparation of edible foods. For example, it is necessary to grind and crush the nubs of the cocoa plant in the process of making chocolate. One type of grinding machine uses grinding rollers that rotate on the flat surface of the inside of a rotating vessel causing the food items that are trapped between the grinding rollers and the flat surface to be crushed and ground.

However, there are deficiencies in the prior technology. First, the grinding rollers, which include a central aperture, are connected by a shaft, the aperture tends to become worn and loose over time. Second, the grinding rollers are not easily removable and replaceable so other types of grinding rollers cannot be quickly and easily installed. Third, there is no way to adjust the downward pressure of the central shaft that holds the grinding rollers in place, so the user cannot control how forcefully the grinding rollers engage with the base plate of the vessel. Fourth, the wiping blade that scraps access material off of the inside wall of the vessel, is not spring biased, so it can not automatically adjust itself for ideal scraping action. Fifth, the vessel is held only by the motor shaft and is not held evenly around its base perimeter. Sixth, there is no means for adjusting the temperature of the inside of the vessel. Seventh, there is no way to easily adapt the grinder to be used for other applications such as a mortar and pestle application.

BRIEF SUMMARY OF THE INVENTION

The primary object of the invention is to provide a multi-purpose food grinding machine that can grind such items as cocoa nibs and turn the items into a fine paste or powder.

Another object of the invention is to provide a multi-purpose food grinding machine that allows the user to adjust the downward pressure on the grinding members.

Another object of the invention is to provide a multi-purpose food grinding machine that allows the user to easily remove and replace grinding elements depending on what type of food is being ground.

A further object of the invention is to provide a multi-purpose food grinding machine where each grinding member includes a ball bearing assembly at its rotational attachment point.

Yet another object of the invention is to provide a multi-purpose food grinding machine that includes a spring biased scraping blade for removing ground material from the side walls of the food holding container.

Still yet another object of the invention is to provide a multi-purpose food grinding machine that allows the interior of the food holding container to be heated or cooled.

Another object of the invention is to provide a multi-purpose food grinding machine that can be adapted to become a mortar and pestle type grinding device.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a multi-purpose food grinding machine comprising an open topped cylindrical vessel, a vessel grinding base plate, a hollow base housing, a structural support frame, a gear reduced motor, a food grinding apparatus, a food scraping apparatus, the base housing being supported by the structural support frame, the open topped cylindrical vessel having a keyed aperture fixedly and centrally attached to its underside, the motor shaft exiting the base housing and having a male shaft and key that mates with the cylindrical base aperture causing the vessel to rotate when in operation, the structural support frame including a hinged, horizontally disposed top most cross bar, said cross bar removably fastened on one side of the frame by standard means, the cross bar having a centrally located aperture for retaining a downwardly and centrally disposed shaft, the shaft terminating at its top most portion in a spring biased pressure adjustment mechanism, the shaft terminating at its lowest portion in a grinding member receiving portion, the grinding member receiving portion including off set shafts that removably retain the grinding members, the grinding members being round in cross section where the lowest horizontal portion of each grinding member is in contact with the grinding base plate, the grinding members caused to rotate as the vessel is rotated by the gear reduced motor, the rotating grinding meanders crushing any food items that are trapped between the rotating grinding members and the grinding base plate and the food scraping apparatus terminating in a food scraping member and fixed to the centrally disposed shaft in a spring biased fashion so that the food scraping member can remove food items from the side walls of the vessel and cause them to drop back into the base portion of the vessel to be further crushed and ground.

The present invention is an improvement over the prior art use of stone rollers used with stone base plates. Features included in the invention are:

1. A spring loaded tension device that as isolated from the food products and is easy to clean.
2. A spring loaded tension device provided with a hydraulic or mechanical screw compression device allowing the user to adjustably reproduce the compression and the tension can be continuously variable or programmable.
3. Multiple thin cylindrical roller stones arranged next to one another versus one wide cylindrical roller on each side of the center shaft.
4. Use of a metallic grinding surface which is modified with arc-shaped cuts or grooves which provide cutting edges for smoothing fibrous materials and are easy to clean after use.
5. Use of a metal base plate for providing efficient conduction of heat and providing uniform temperature control.
6. Use of a ferric based base plane and grinding cone. Or cylinders, for providing induction heater-friendly grinder elements.
7. The combination of grinding and conching of chocolate in the same set-up of a single machine by varying the speed and vertical pressure using conical shaped grinding rollers and multiple thin cylindrical rollers.
8. Use of a specially designed mixing paddle for causing couching of chocolate following completion of a grinding operation.
9. Heating or cooling the product during grinding by treating it with forced hot air or forced hot nitrogen.
10. The use of specially designed grinder rollers and cones for minimizing wear of metallic or polymeric surfaces by using ceramic bearings fitted between the rollers and cones and the horizontal shaft.

The invention is useful in, but not limited to, the following applications:

1. Food, preparations, particularly of fibrous materials and oily substances, including but not limited to biological tissues.
2. Grinding of temperature sensitive materials which require minimal rise in temperature during grinding.
3. Grinding of moisture sensitive products such as chocolate.
4. Grinding of shear sensitive products.
5. Use of a non-porous, metal grinding surface to provide for easy cleaning, thereby avoiding the current granite stone that is porous and difficult to clean.
6. The use of a heat conducting metal grinding surface allows for precise and rapid temperature control via thermal conduction, or through the use of a heating or cooling jacket.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
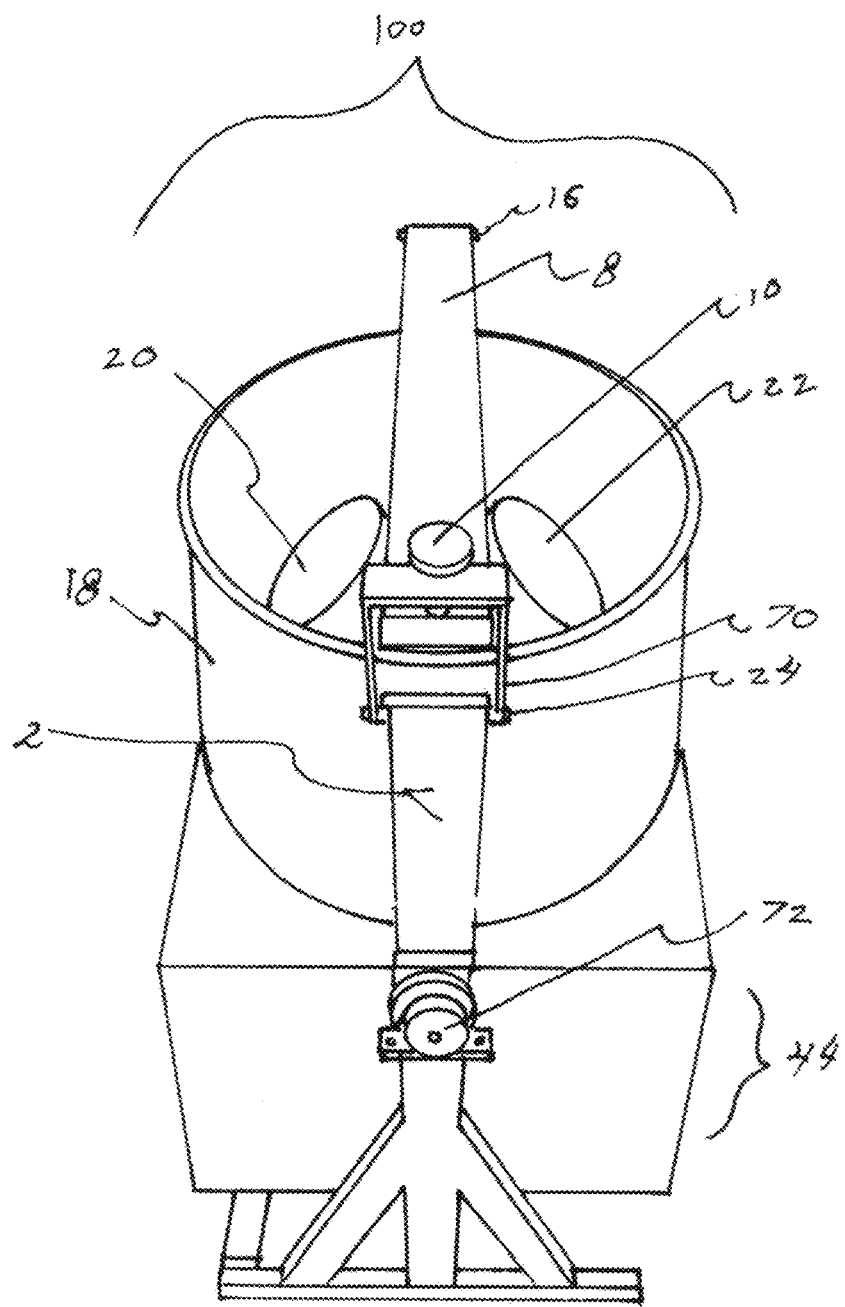
FIG. 1 is a perspective view of the invention.

Referring now to FIG. 1 we see a perspective view of the invention 1. An outer rigid frame 2 supports a hollow base housing 44 which is fixedly attached to it. A removable and replaceable open topped cylindrical vessel sits on top of housing 44. In this embodiment, a swivel point 72 is built into the outer frame so that the housing 44 and vessel 18 can be tilted at an angle when necessary. The outer frame 2 includes a hinged 16 top cross bar 8. The cross bar is held down by clamp member 70 and clamp knob 10. The top cross bar 8 can be easily lifted when the clamp member 70 is disengaged allowing the vessel 18 and its contents to be easily removed and replaced. The top of the cone shaped grinding members 20, 22 can be seen within vessel 18.

Figure 2:
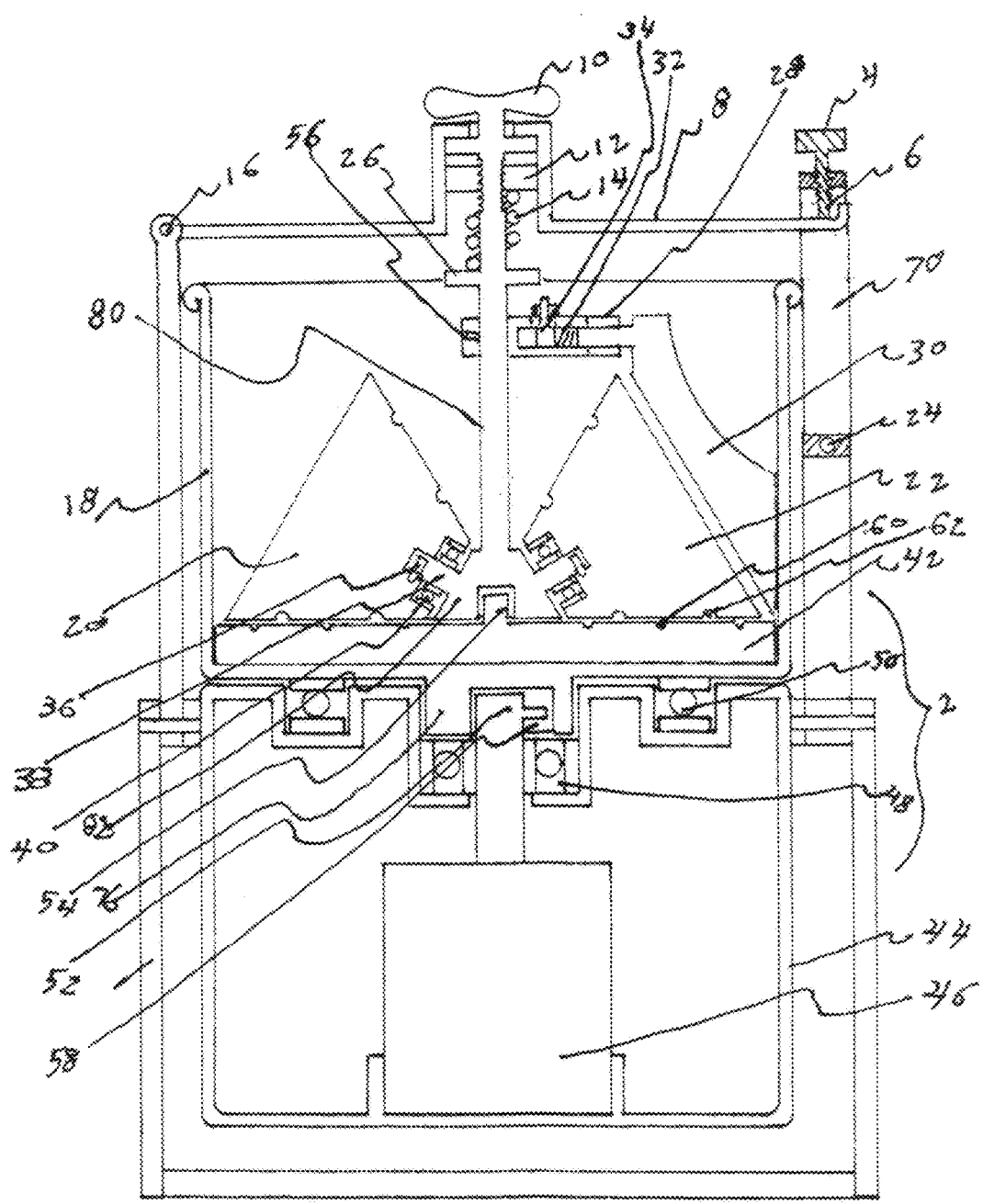
FIG. 2 is a side section view of the invention.
Figure 7:
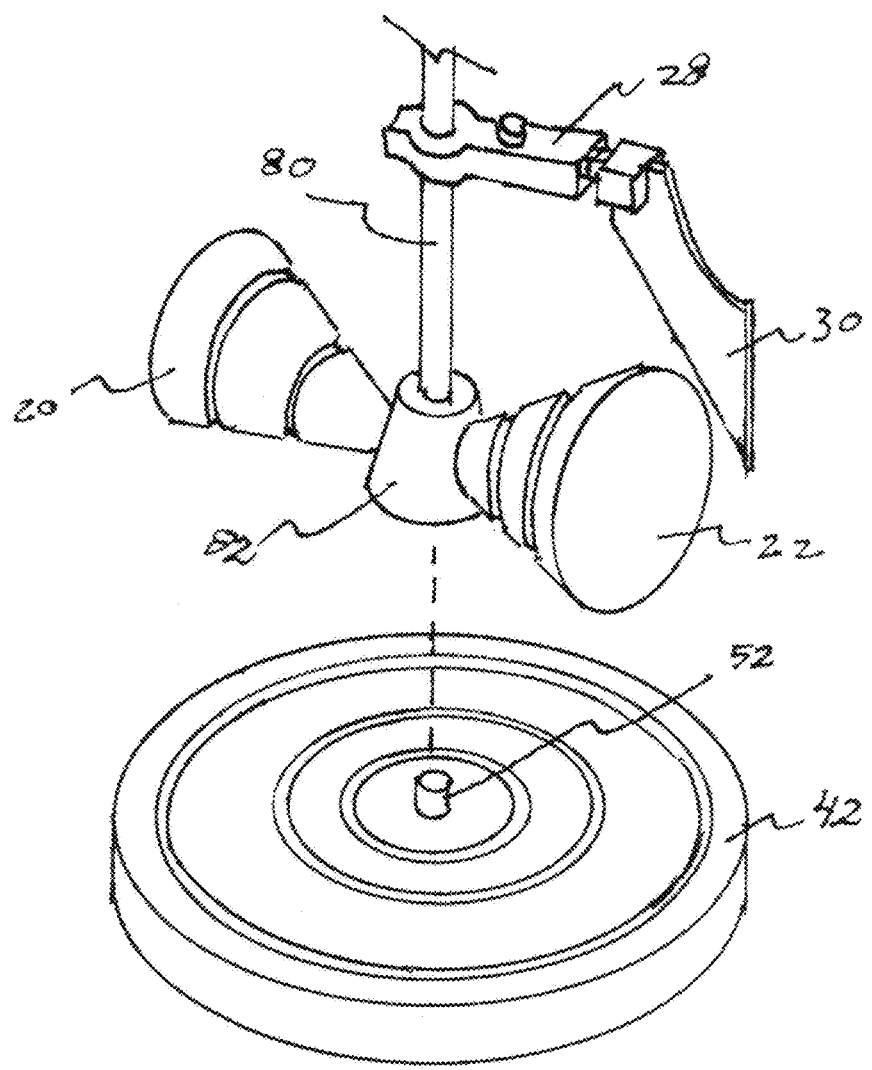
FIG. 7 is an exploded view of a pair of cone shaped grinding members and the spring biased side wall scraping member.

FIG. 2 shows a side section view of the invention that bisects the entire device 100. The outer rigid frame 2 supports lower base housing 44. A gear reduced motor 46 is fixedly mounted within housing 44. The keyed shaft 58 of the motor is held in place by bearing assembly 48 and protrudes through the top of housing 44 to removably engage a mating keyed aperture 76 located on the underside of vessel 18. The output shaft speed of the gear reduced motor 46 may be varied by a standard electronic motor speed circuit not shown. The gear motor can be substituted with a standard AC or DC electric motor coupled with a separate gearbox connected by a belt or chain drive mechanism. Vessel 18 is also supported by thrust bearing 50 so that none of the downward pressure of the cone shaped grinding members 20, 22 is transferred to the motor shaft 58. Base grinding plate 42 can be made of stone such as granite, or stainless steel or other hard wearing surface. The cone shapes 20, 22 and the base plate 42 include groves 60, 62 as can be seen more clearly in the exploded view shown in FIG. 7. Central shaft 80 terminates at its lower end in a cone shape 82 that has offset shafts 38 protruding from it. Apertures in the ends of the cone shapes 20, 22 include sealed food grade ball bearings for the shafts 38 to ride on. A standard spring ball plunger assembly 36, removably secures the cone shape 20 to the shaft 38. The length of the shaft can be extended all the way through the conical stone. In this way, the user can easily remove and replace the grinding members 20, 22 for different food grinding applications or for replacement if any portion of a grinding member 20, 22 becomes worn or defective. The upper end of shaft 80 includes a spring biasing assembly comprised of threaded nut 12, spring 14, retaining plate 26 and adjustment knob 10. The force adjustment knob 10 is coupled to the center shaft 80 by a tongue and groove type coupling mechanism not shown in the diagram. When the user turns the adjustment knob 10, the keyed nut 12 is forced up or down depending on the direction of turning to increase or decrease downward pressure on the grinding members 20, 22. Alternatively additional tension adjustment can be done by an adjustable tension screw 6 with a handle 4 that is attached to the clamping band 70. A side scraping member 20 is attached to central shaft 80 via lock nut 56. The scraping member 30 is made of a non-scratching food grade material such as Teflon or acetate. The scraping member 30 is attached to a sliding post assembly 28 that is spring biased by compression spring 32. The spring tension is adjusted by sliding adjustment block 34 that can be looked into place by standard means such as a set screw.

Figure 3:
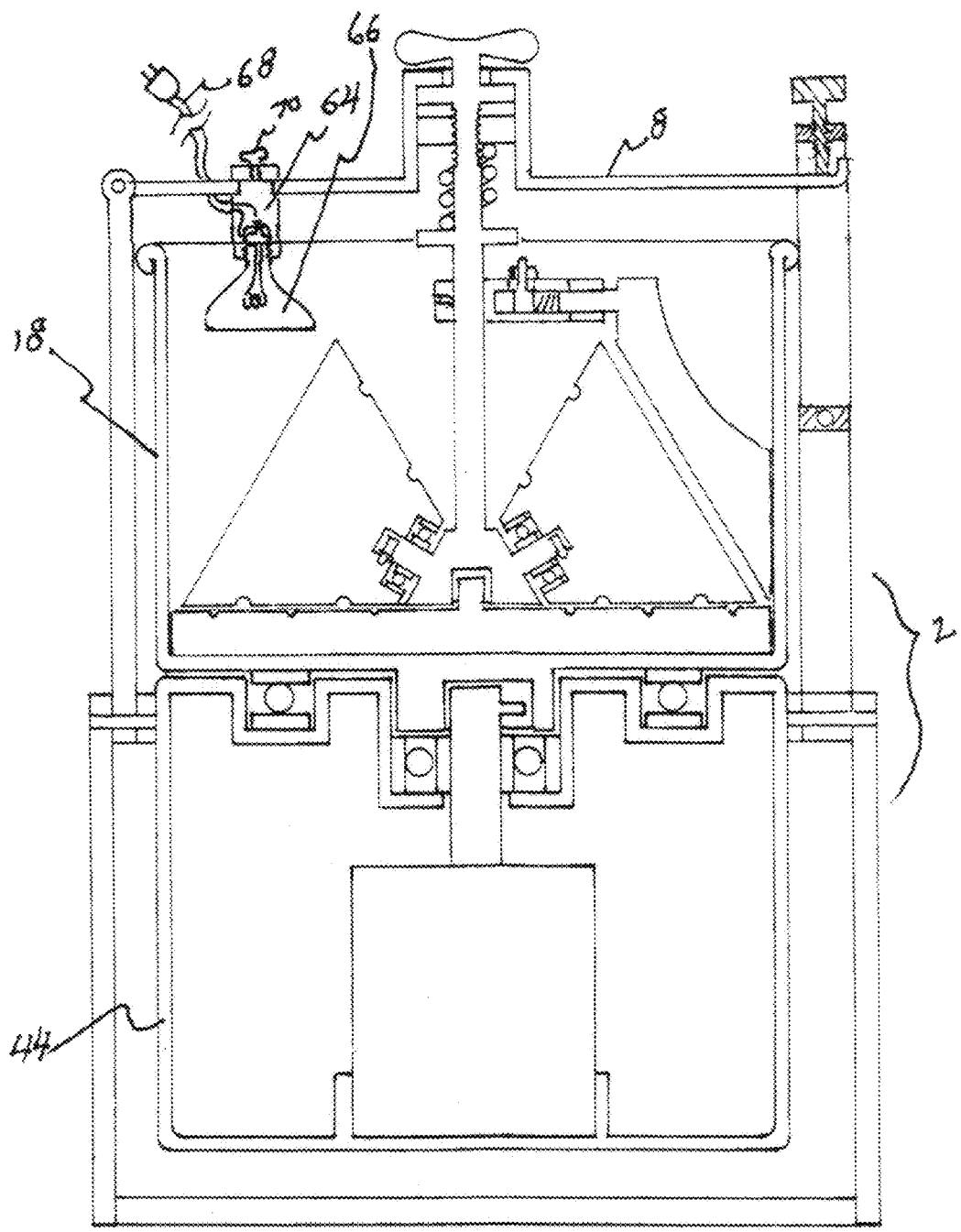
FIG. 3 is a side section view of the invention with a heating element added.

FIG. 3 shows an identical section view as shown in FIG. 2 except that a heating member in the form of an infrared lamp 66 and lamp socket 64 has been added to cross bar 8 and held in place by clamping band 70. In this way, the contents of the vessel 18 can be heated as needed. The addition of a standard temperature sensing probe and a suitable controller can turn the lamp on or off as needed to hold a programmed, predetermined temperature. Other heating sources may also be used such as a hot air generating device similar to a hair dryer. Alternately, a cooling device such as a peltier chip may be used to cool the area within the vessel 18. A peltier device can cause a cooling or heating effect depending on the polarity of the connecting wires to the DC power supply. Other means of heating and cooling can be accomplished by installing a standard heating or cooling element inside the lower housing and creating a plurality of apertures in the top of the housing 44 to allow the heated or cooled air to reach the bottom of the vessel 18. Alternatively the heating of the rotating vessel 13 can be accomplished by induction heating system where the induction coils are located under the vessel. The induction coil also can be located as part of the housing 44. In such induction heating system, the bottom part of the rotating vessel 18 can be fitted with suitable metal such as steel to receive the induction heating. Induction heating system is more suitable for grinding appliances made with stainless steel bottom plate discussed later. The induction coils are positioned in such a way, the heated regions are constantly contacted by the contents of the vessel 18.

Figure 4:
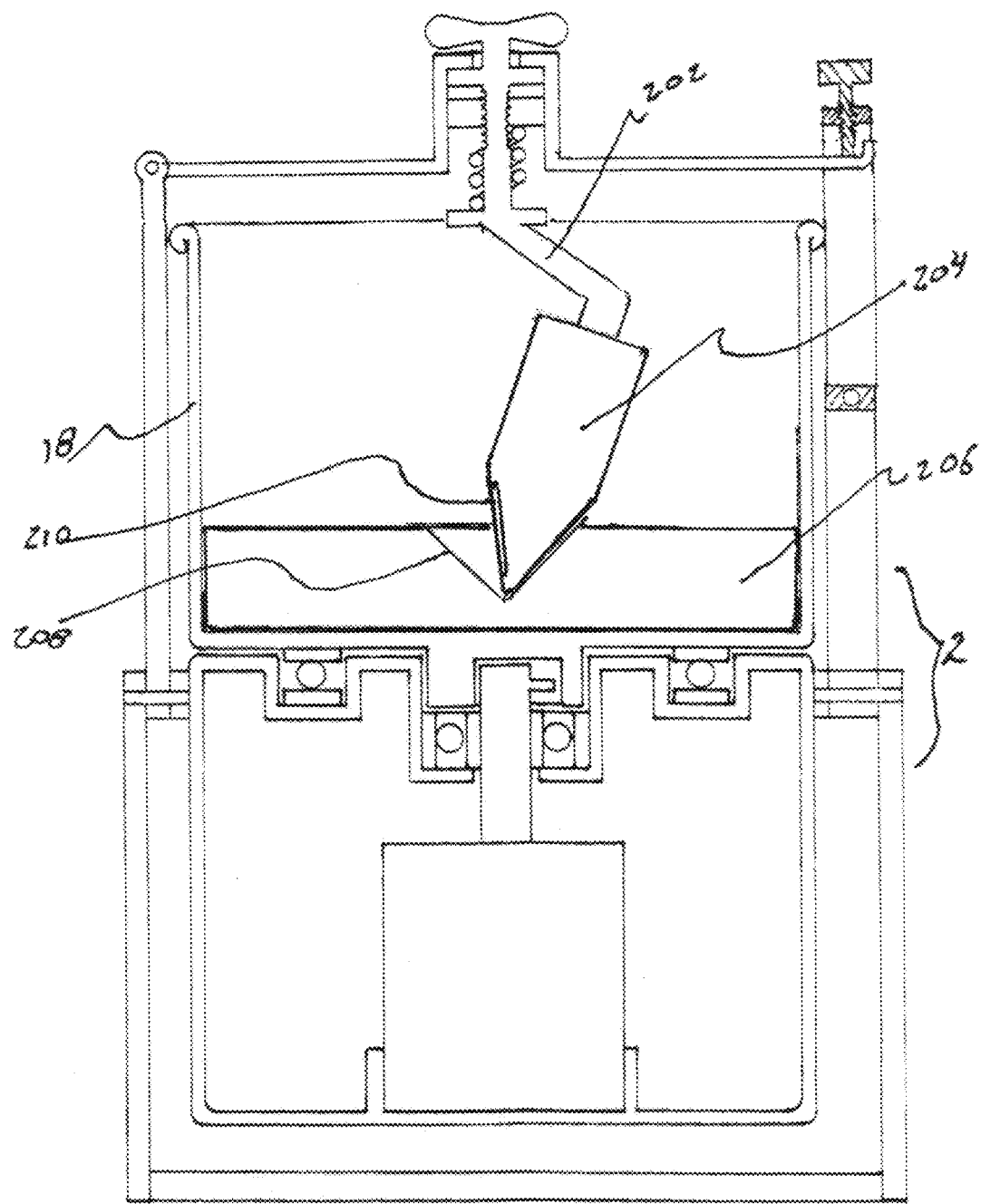
FIG. 4 is a side section view of the invention with a mortar and pestle component added.

FIG. 4 shows another side section view of the invention. However, in this case, the bottom grinding place 42 has been replaced by a base plate 206 that includes a mortar portion 208. The central shaft 80 has been replaced by an angled shaft 202 that holds a rotatable pestle 204. Grooves 210 in the pestle help improve the grinding action. The mortar base plate 206 can be made or stone or stainless steel as can the pestle 204. This setup is ideal for grinding items such as nuts to form nut paste. The pressure applied to the product can be controlled by the tensioning spring located above the pestle shaft.

Figure 5:
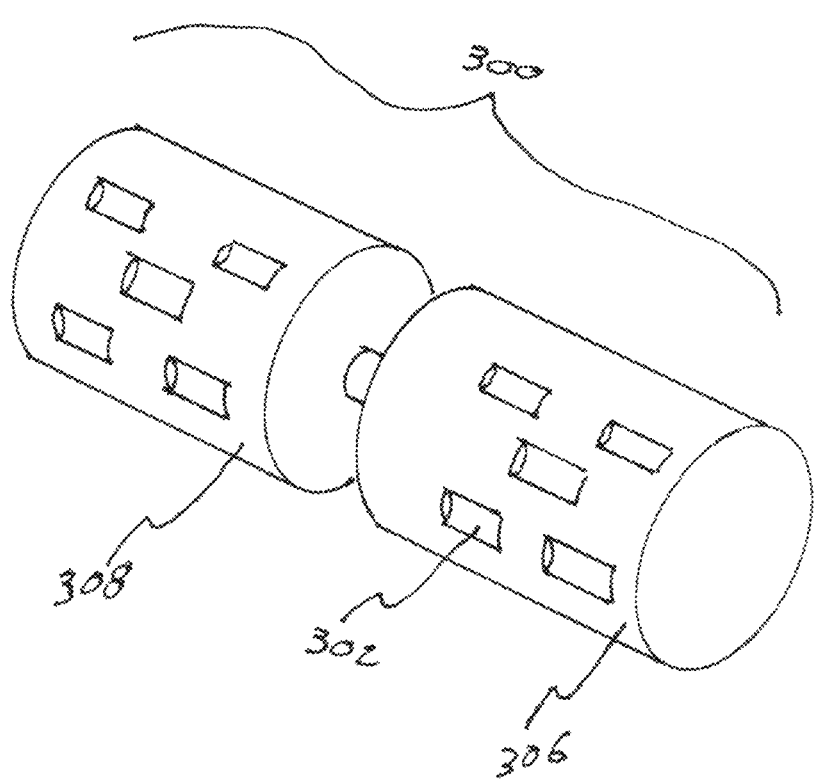
FIG. 5 is a perspective view of a pair of cylindrical grinding members.

FIG. 5 is a perspective view of an alternate design for the grinding members 300 that would replace cone grinding members 20, 22. These cylindrical grinding members 306, 308 include concave indentations 302 that help facilitate the grinding process. The grinding members 306, 308 can be made out of stone such as granite or out of stainless steel, or other dense material suitable for the act of grinding and crushing food items. The indentations can be rectangular, elliptical, circular and the depth can have various profiles. One with parabolic depth profile is preferable for easy cleaning and efficient and uniform grinding. The edge of a typical profile acts as a cutting edge to facilitate processing fibrous materials.

Figure 6:
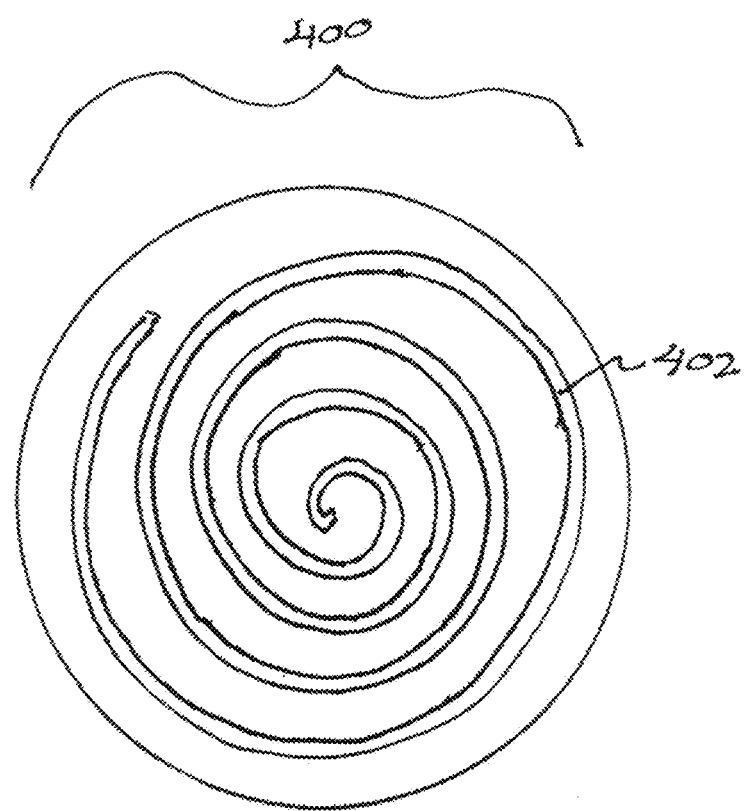
FIG. 6 is a plan view of the base grinding plate.

FIG. 6 shows a plan view of an alternate groove design 402 for the base grinding plate 400 that would replace original base grinding plate 42. This spiral design 402 has been shown to produce improved grinding effects as compared to the concentric groove design shown in FIG. 7. The depth profile of the groove can have various configurations. As discussed earlier, one with parabolic depth profile is preferable for easy cleaning and efficient and uniform grinding. The above description and drawings describe an improved multi-purpose food grinding machine that is superior in operation to existing food grinding machines. The present invention is also easier to maintain and to remove and replace or repair parts as needed. The removable and replaceable grinding members and grinding plates allow for the present invention to be used with a wide variety of food crushing and grinding applications.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. A multi-purpose food grinding machine comprising:
an open topped cylindrical vessel;
a vessel grinding base plate;
a hollow base housing;
a structural support frame;
a gear reduced motor;
a food grinding apparatus; and
a food scraping apparatus;
said base housing supported by said structural support frame; said open topped cylindrical vessel having a keyed aperture fixedly and centrally attached to its underside; said motor shaft exiting said base housing and having a key that mates with said cylindrical base aperture causing said vessel to rotate when in operation; said structural support frame including a hinged, horizontally disposed top most cross bar; said cross bar removably fastened on one side of said frame;
said cross bar having a centrally located aperture for retaining a downwardly and centrally disposed shaft; said shaft terminating at its top most portion in a spring biased pressure adjustment mechanism; said shaft terminating at its lowest portion in a grinding member receiving portion; said grinding member receiving portion including off set shafts that removably retain said grinding members; said grinding members being round in cross section where the lowest portion of each grinding member is in contact with said grinding base plate; said grinding members caused to rotate as said vessel is rotated by said gear reduced motor; said rotating grinding members crushing any food items that are trapped between said rotating grinding members and said grinding base plate and said food scraping apparatus terminating in a food scraping member and fixed to said centrally disposed shaft in a spring biased fashion so that said food scraping member can remove food items from the side walls of said vessel and cause them to drop back into the base portion of said vessel to be further crushed and ground.

2. A multi-purpose food grinding machine as claimed in claim 1 wherein said grinding base plate and said grinding members include grooves carved into each surface to facilitate the grinding process.

3. A multi-purpose food grinding machine as claimed in claim 1 wherein each said grinding member is removable and replaceable via a spring plunger retaining member.

4. A multi-purpose food grinding machine as claimed in claim 1 wherein each said grinding member includes a sealed food grade ball bearing assembly for receiving said offset shafts of said grinding member receiving portion.

5. A multi-purpose food grinding machine as claimed in claim 1 wherein said hollow base housing includes a thrust bearing that engages the bottom of said rotating vessel.

6. A multi-purpose food grinding machine as claimed in claim 1 wherein a shaft of said gear reduced motor is rotatably held in place by a ball bearing assembly fixed in place in the top of said hollow base housing.

7. A multi-purpose food grinding machine as claimed in claim 1 wherein said grinding base plate and said grinding members are made of granite.

8. A multi-purpose food grinding machine as claimed in claim 1 wherein said grinding base plate and said grinding members are made of stainless steel.

9. A multi-purpose food grinding machine as claimed in claim 1 wherein the motor speed of said gear reduced motor is adjustable by means of a standard speed adjustment circuit.

10. A multi-purpose food grinding machine as claimed in claim 1 wherein said grinding members are cone shaped.

11. A multi-purpose food grinding machine as claimed in claim 1 wherein said grinding members are cylindrically shaped.

12. A multi-purpose food grinding machine as claimed in claim 1 further comprising an adjustable temperature controlling device mounted to the upper portion of said support frame and supplying a controlled degree of heat or cooling to the contents within said cylindrical vessel.

13. A multi-purpose food grinding machine as claimed in claim 2 wherein said grooves in said grinding base plate are concentric.

14. A multi-purpose food grinding machine as claimed in claim 2 wherein said grooves in said grinding base plate are concentrically spiral.

15. A multi-purpose food grinding machine as claimed in claim 2 wherein said grooves in said cylindrical grinding members are a plurality of concave depressions evenly spaced around the surface of said cylindrical members.

16. A multi-purpose food grinding machine as claimed in claim 1 wherein said base plate and grinding members are made with high strength metals selected from the group consisting of stainless steel and titanium.

\* \* \* \* \*